United States Patent
Takada

(10) Patent No.: US 8,455,787 B2
(45) Date of Patent: Jun. 4, 2013

(54) LASER PROCESSING APPARATUS, PROCESS CONTROL APPARATUS, AND PROCESSING APPARATUS

(75) Inventor: Hiroko Takada, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 630 days.

(21) Appl. No.: 12/665,574

(22) PCT Filed: Jul. 4, 2008

(86) PCT No.: PCT/JP2008/062177
§ 371 (c)(1),
(2), (4) Date: Dec. 18, 2009

(87) PCT Pub. No.: WO2009/005145
PCT Pub. Date: Jan. 8, 2009

(65) Prior Publication Data
US 2010/0193479 A1    Aug. 5, 2010

(30) Foreign Application Priority Data
Jul. 4, 2007  (JP) ................................ 2007-176371

(51) Int. Cl.
*B23K 26/00*  (2006.01)
(52) U.S. Cl.
USPC .............. 219/121.6; 219/121.63; 219/121.67; 219/121.78
(58) Field of Classification Search
USPC .................. 219/121.6, 67, 68, 69, 78–83
See application file for complete search history.

(56) References Cited

U.S. PATENT DOCUMENTS

| | | | |
|---|---|---|---|
| 5,059,759 A * | 10/1991 | Kudo et al. | 219/121.78 |
| 5,491,318 A | 2/1996 | Sugawara et al. | |
| 5,548,098 A * | 8/1996 | Sugawara et al. | 219/121.67 |
| 2006/0092990 A1* | 5/2006 | Koga et al. | 372/7 |

FOREIGN PATENT DOCUMENTS

| | | |
|---|---|---|
| JP | 06-269970 A | 9/1994 |
| JP | 08-206862 A | 8/1996 |
| JP | 2001-170790 A | 6/2001 |
| JP | 2003-236691 A | 8/2003 |
| JP | 2005-334915 A | 12/2005 |

* cited by examiner

*Primary Examiner* — Minh-Loan T Tran
*Assistant Examiner* — Falzi Erdem
(74) *Attorney, Agent, or Firm* — Sughrue Mion, PLLC

(57) ABSTRACT

A laser processing apparatus in which a workpiece is placed on a work support base that supports the workpiece at a plurality of support points and performs, while moving a processing head in a horizontal direction with respect to the workpiece, laser processing on the workpiece on the work support base by the processing head, includes a tilt judging unit that judges, based on a positional relationship between a product chip that is to be separated from the workpiece when the workpiece is subjected to laser processing and support points, whether the product chip tilts in a height direction and projects upward on a side of the processing head from the workpiece before laser processing; and a drive control unit that controls a height of the processing head with respect to the workpiece when moving the processing head to a processing position for a next product chip after completing laser processing on the product chip based on a judgment result of the tilt judging unit.

14 Claims, 10 Drawing Sheets

US 8,455,787 B2

LASER PROCESSING APPARATUS, PROCESS CONTROL APPARATUS, AND PROCESSING APPARATUS

TECHNICAL FIELD

The present invention relates to a laser processing apparatus, a process control apparatus, and a processing apparatus that control movement of a processing head so that the processing head does not hit a workpiece.

BACKGROUND ART

Conventionally, in a laser processing apparatus that manufactures a plurality of products (a plurality of pieces) by laser processing one workpiece (a plate), one workpiece (hereinafter, work) is laser processed in order by moving a processing head (a processing nozzle) to a processing position of the next product for every time laser processing of one product is completed.

In the laser processing, a work is supported by a work support (a workpiece support base) that supports the work at a plurality of points for holding the work (for example, see Patent Document 1).

Patent Document 1: Japanese Patent Application Laid-open No. 2001-170790

DISCLOSURE OF INVENTION

Problem to be Solved by the Invention

However, in the above conventional technology, part of a product after processing may drop between plates of the work support, and the product after processing may tilt. In order to prevent the tilted product from hitting a processing head, for example, it is needed, when moving the processing head to a processing position for the next product after processing one product, to move the processing head to the processing position for the next product after lifting the processing head to an origin (an uppermost portion) in a Z-axis (height) direction. Therefore, the moving distance of the processing head in the Z-axis direction becomes long, so that it takes a long time for laser processing the whole work.

The present invention has been achieved in view of the above, and it is an object of the present invention to provide a laser processing apparatus, a process control apparatus, and a processing apparatus capable of performing laser processing on a workpiece efficiently and promptly while preventing a processing head from hitting a product chip after processing.

Means for Solving Problem

In order to solve the above mentioned problem and achieve the object, in a laser processing apparatus in which a workpiece before laser processing is placed on a work support base that supports the workpiece at a plurality of support points and performs, while moving a processing head that irradiates the workpiece with a laser beam in a horizontal direction with respect to the workpiece, laser processing on the workpiece on the work support base by the processing head, the present invention includes a tilt judging unit that judges, based on a positional relationship between a product chip that is to be separated from the workpiece when the workpiece is subjected to laser processing and support points of the work support base that supports the product chip, whether the product chip after laser processing tilts in a height direction and projects upward on a side of the processing head from the workpiece before laser processing; and a processing head control unit that controls a height of the processing head with respect to the workpiece when moving the processing head to a processing position for a next product chip after completing laser processing on the product chip based on a judgment result of the tilt judging unit.

Effect of the Invention

According to the present invention, whether a product chip after laser processing projects on the side of a processing head is judged based on the positional relationship between the product chip and support points of a work support base, and a height of the processing head when moving the processing head from the product chip to the next product chip is controlled based on the judgment result, so that a workpiece can be subjected to laser processing efficiently and promptly while preventing the processing head from hitting the product chip after processing.

EXPLANATIONS OF LETTERS OR NUMERALS

Figure 1:
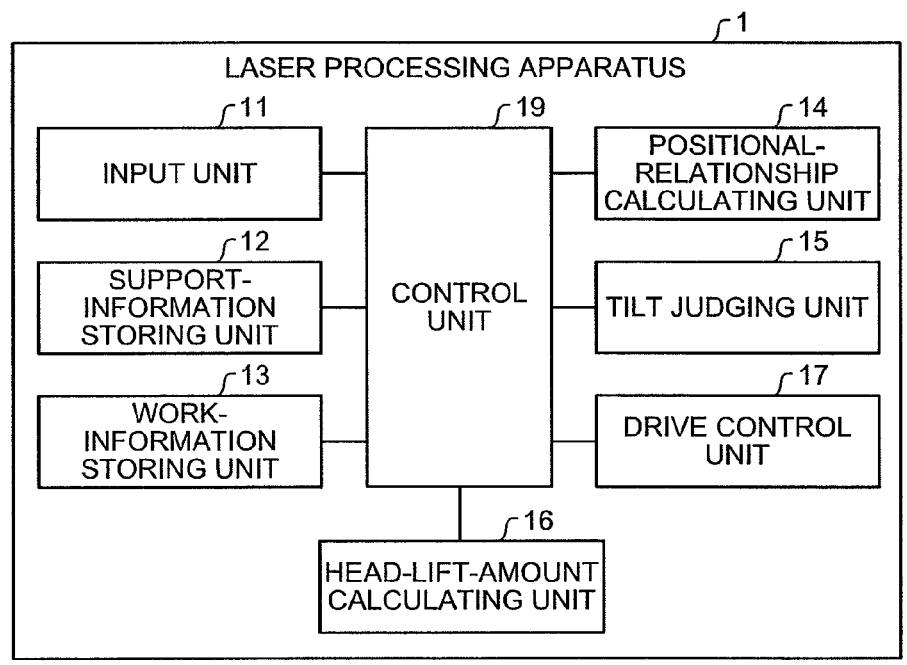
FIG. 1 is a block diagram illustrating a configuration of a laser processing apparatus according to a first embodiment.

1 laser processing apparatus
2 support base 5 processing head
11 input unit
12 support-information storing unit
13 work-information storing unit
14 positional-relationship calculating unit
15 tilt judging unit
16 head-lift-amount calculating unit
17 drive control unit
19 control unit
22 positioning portion
25 position detecting unit
26 in-plane-tilt-amount calculating unit
31 work
40 reference position
A1 to An work support
B1 to B16 product
C1 to C3 product portion
L1 arrangement interval
M1 to Mm product
P1 to P4 gravity center
Q needle
R1, R2 origin
S1, S2 pierce position
a21 to a26, a31 to a36, d1 to d3 support point
e1, e2 plate thickness
h1, h2 projection value

BEST MODE(S) FOR CARRYING OUT THE INVENTION

Exemplary embodiments of a laser processing apparatus, a process control apparatus, and a processing apparatus according to the present invention will be explained below in detail with reference to the accompanying drawings. The present invention is not limited to the embodiments. In the following explanation, explanation is given with a workpiece (one plate) before laser processing as a work, and a workpiece (one piece) after laser processing that is separated from the work by laser processing as a product. A work in the embodiments corresponds to a workpiece in claims, and a product in the embodiments corresponds to a product chip in claims. The product (a product chip) can be a part actually processed as an actual product (a part separated from a work as an actual product), or can be a part other than an actual product. The part other than an actual product is, for example, a part separated from a work by drilling processing to an actual product, edge cutoff processing to an actual product, or the like.

First Embodiment

FIG. 1 is a block diagram illustrating a configuration of a laser processing apparatus according to a first embodiment of the present invention. A laser processing apparatus 1 is a laser processing apparatus that calculates a lift position (height) of a processing head when moving the processing head to a processing position of the next product after processing one product for each product based on a positional relationship between the product and work supports.

The laser processing apparatus 1 includes an input unit 11, a support-information storing unit 12, a work-information storing unit 13, a positional-relationship calculating unit 14, a tilt judging unit 15, a head-lift-amount calculating unit (a head-position calculating unit) 16, a drive control unit (a processing head control unit) 17, and a control unit 19. In the laser processing apparatus 1 shown in FIG. 1, means are shown that are related to a position control of a processing head in a height direction to a processing position for the next product from a position at which processing of one product is completed, and means that are related to a processing control using, for example, an NC program, and the like are not shown. Moreover, in the laser processing apparatus 1 shown in FIG. 1, a processing head that performs laser processing on a work, a work support that supports a work, and the like are not shown.

The input unit 11 includes a mouse and a keyboard, and inputs information about an insert position (a position with respect to a support base 2 to be described later) and an arrangement interval for work supports as support information. The input unit 11 sends the input work support information to the support-information storing unit 12.

Moreover, the input unit 11 inputs information about the shape and the size of a work, information about the plate thickness of a work, information about the shape and the size of a product, information about the position (arrangement) of each product on a work, information about the position of a work with respect to the support base 2, and the like as work information about a work. The input unit 11 sends the input work information to the work-information storing unit 13. Various pieces of the information can be input to the input unit 11 manually by a user of the laser processing apparatus 1, or can be input to the input unit 11 by reading information stored in an external device.

The support-information storing unit 12 is a storing unit such as a memory that stored therein the support information from the input unit 11. The work-information storing unit 13 is a storing unit such as a memory that stores therein the work information from the input unit 11.

The positional-relationship calculating unit 14 calculates a positional relationship (coordinates) between each product as a processing target and work supports based on the support information in the support-information storing unit 12 and the work information in the work-information storing unit 13. The positional-relationship calculating unit 14 sends the calculated positional relationship to the tilt judging unit 15.

The tilt judging unit 15 judges whether each product drops between work supports (on the support base 2) after laser processing (whether a product tilts) based on the positional relationship calculated by the positional-relationship calculating unit 14.

The tilt judging unit 15 in the present embodiment calculates, for example, a position (a position with respect to the support base 2) of the gravity center of a product after processing. Moreover, the tilt judging unit 15 extracts a position of each support point of work supports supporting a product, and extracts an area surrounded by respective support points as a support area (a supporting area) for each product. Then, the tilt judging unit 15 judges whether each product after processing tilts based on whether the calculated position of the gravity center is within the support area. If the calculated gravity center is outside the support area, the tilt judging unit 15 judges that the product after processing tilts. If the calculated gravity center is inside the support area, the tilt judging unit 15 judges that the product after processing does not tilt.

If the tilt judging unit 15 judges that the product after processing tilts, the tilt judging unit 15 calculates a distance (value) in the height direction that the product after processing projects with respect to the height of a work set before processing as a projection value (projection dimension) based on the size (height) of work supports, the shape and the size of the product, the position of the gravity center of the product, and the like. In other words, the tilt judging unit 15 calculates the distance that the product after processing projects upward on the side of the processing head from the work before processing by tilting in the height direction as the projection value. The tilt judging unit 15 sends the judgment result indicating whether the product tilts and the calculated projection value to the head-lift-amount calculating unit 16.

The head-lift-amount calculating unit 16 calculates a lift amount (height from the time of work processing) (head lift amount) of the processing head when moving the processing head to a processing position for the next product based on the judgment result and the projection value from the tilt judging unit 15. If the judgment result from the tilt judging unit 15 indicates no tilt, the head-lift-amount calculating unit 16 sets the lift amount of the processing head to 0. The head-lift-amount calculating unit 16 sends the calculated lift amount of the processing head to the drive control unit 17.

The drive control unit 17 controls the height of the processing head so that the processing head is lifted by the lift amount calculated by the head-lift-amount calculating unit 16 when moving the processing head to a processing position for the next product. The control unit 19 controls the input unit 11, the support-information storing unit 12, the work-information storing unit 13, the positional-relationship calculating unit 14, the tilt judging unit 15, the head-lift-amount calculating unit 16, and the drive control unit 17.

Figure 2:
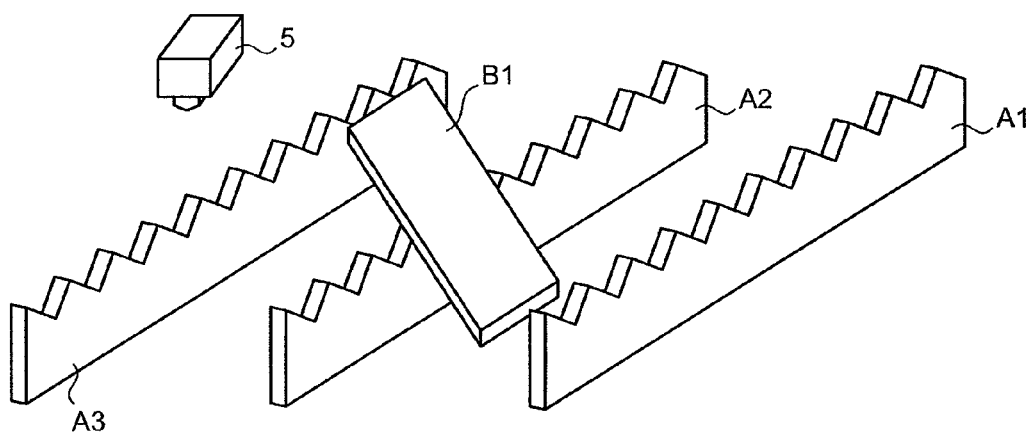
FIG. 2 is a schematic diagram (1) for explaining a tilt of a product.
Figure 3:
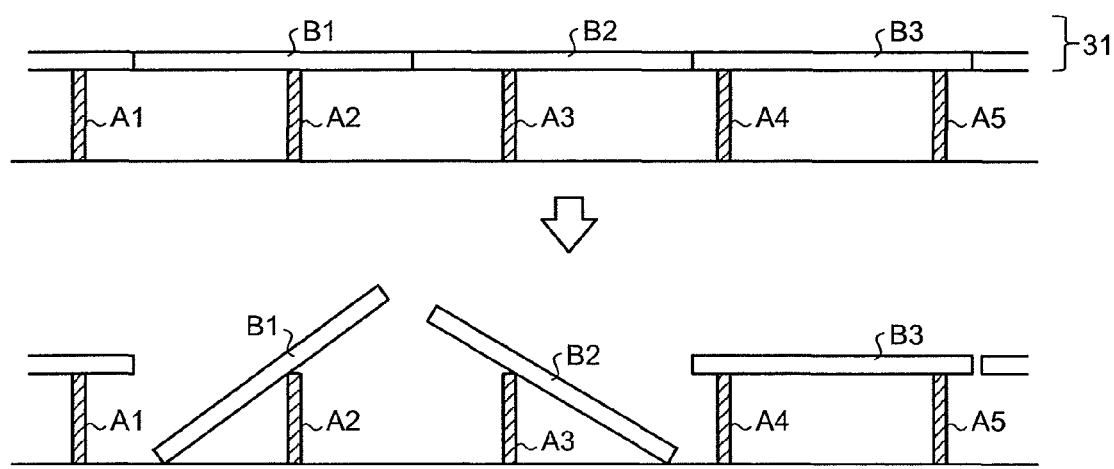
FIG. 3 is a schematic diagram (2) for explaining a tilt of a product.

Here, a tilt of a product after processing is explained. FIG. 2 and FIG. 3 are schematic diagrams for explaining a tilt of a product. As shown in FIG. 2, because a product B1 after processing is separated from a work, the product B1 is not always supported by a plurality of work supports among work supports A1 to A3. For example, when the product B1 separated from the work is supported only by one work support, the product B1 drops between work supports and tilts. FIG. 2 shows a case where the product B1 separated from the work is supported only by the work support A2 and drops between the work support A1 and the work support A2. As a result, the product B1 tilts compared with before processing and projects to a position higher than the height of the work before processing.

As shown in FIG. 3, a plurality of products (for example, products B1 to B3) is separated from a work 31 by laser processing. The dimension of each of the products B1 to B3 and the arrangement interval between work supports are not always the same. Therefore, a position (a support position) of a work support supporting a product is different for each product. Thus, some of the products B1 to B3 of the work 31 drop between work supports, but others do not.

FIG. 3 shows a case where the product B1 drops between the work support A1 and the work support A2, and a product B2 drops between a work support A3 and a work support A4. Moreover, FIG. 3 shows a case where a product B3 is supported by the work support A4 and a work support A5 and thus does not drop between the work supports. In this manner, whether a product drops between work supports depends on each product, so that a tilt of a product is judged for each product after processing in the present embodiment.

Figure 4:
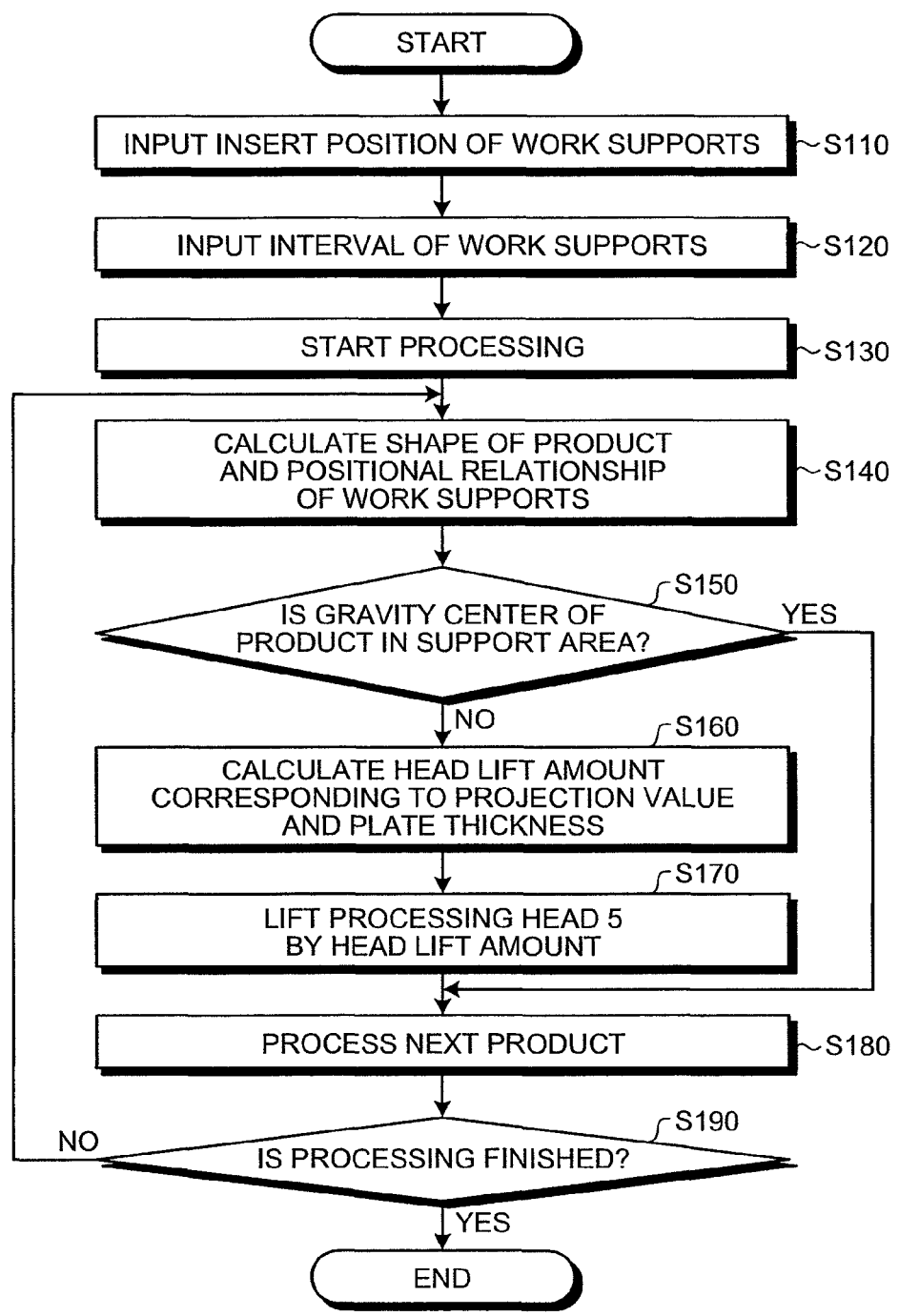
FIG. 4 is a flowchart of a process procedure of the laser processing apparatus according to the first embodiment.

Next, a process procedure of the laser processing apparatus 1 according to the first embodiment is explained. FIG. 4 is a flowchart of the process procedure of the laser processing apparatus according to the first embodiment. A plurality of work supports is set in advance on the support base 2 of the laser processing apparatus 1 at predetermined intervals.

Figure 5:
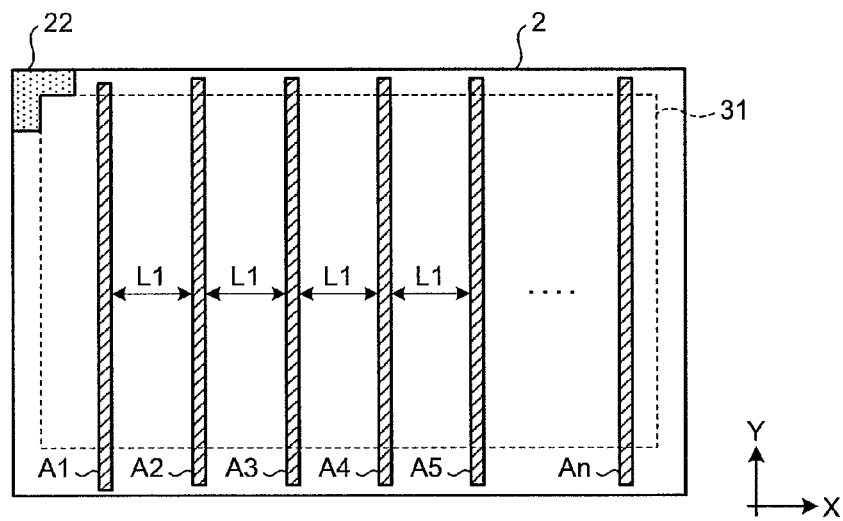
FIG. 5 is a schematic diagram for explaining an arrangement of work supports to a support base.

FIG. 5 is a schematic diagram for explaining an arrangement of work supports to the support base. FIG. 5 is a top view of the work supports when the laser processing apparatus 1 is viewed from the top. On the top surface of the support base (a work support base) 2, groove portions (not shown) are provided for inserting and fixing the work supports A1 to An (n is a natural number). Each of the work supports A1 to An is inserted into the groove portion so that the arrangement interval of the work supports becomes a predetermined distance (an arrangement interval L1). As a result, the work supports A1 to An are arranged to the support base 2 at the predetermined intervals at the predetermined positions.

After arranging the work supports A1 to An to the support base 2, the work 31 is placed on the work supports A1 to An. At this time, the work 31 is placed on the work supports A1 to An so that an edge portion (angle) (two sides) of the work 31 is in contact with a positioning portion (a contact surface) 22 for positioning the work 31.

Information about insert positions (coordinates) and the arrangement interval (the arrangement interval L1) for the work supports to the support base 2 is input by a user to the input unit 11 of the laser processing apparatus 1 as the support information. The input unit 11 sends the work support information input from outside to the support-information storing unit 12, and the support-information storing unit 12 stores therein the support information from the input unit 11 (Step S110).

Moreover, information about the shape and the size of a work, information about the shape and the size of a product, information about the position of each product on a work, and the like are input to the input unit 11 by a user as the work information. The input unit 11 sends the work information input from outside to the work-information storing unit 13. The work-information storing unit 13 stores therein the work information from the input unit 11 (Step S120).

Figure 6:
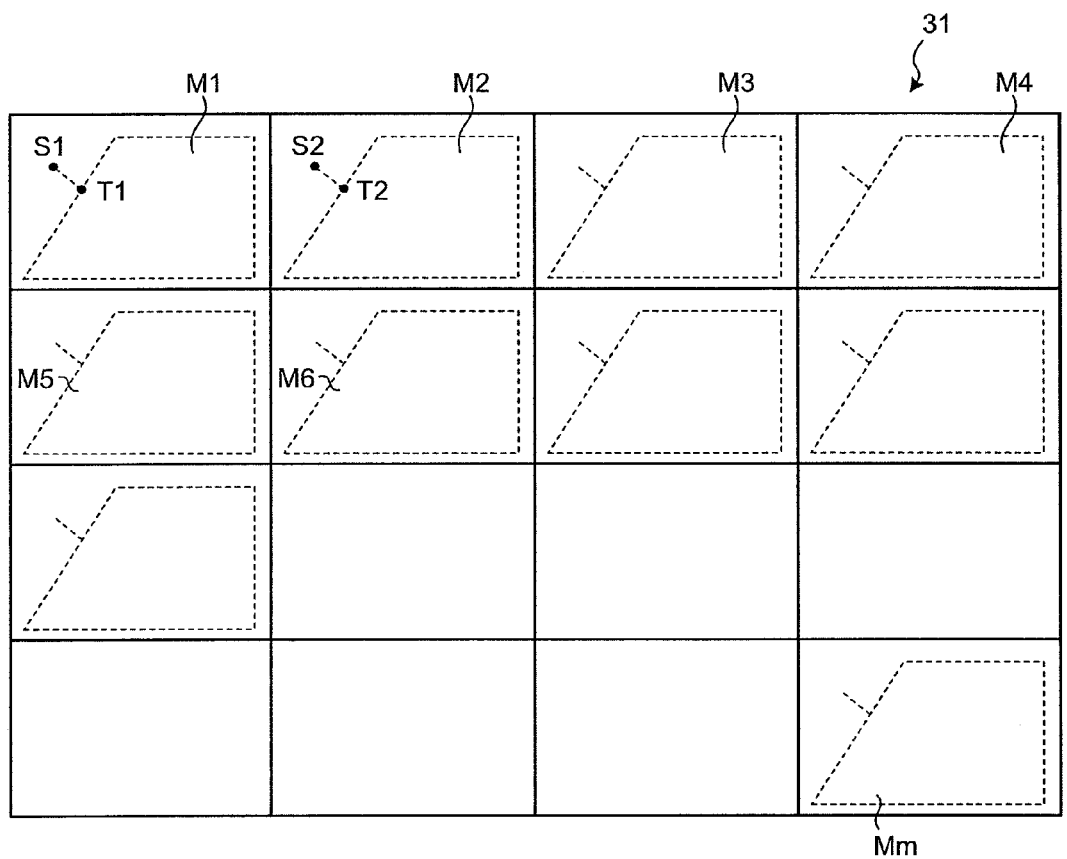
FIG. 6 is a schematic diagram for explaining a process order of each product by the laser processing apparatus.

Thereafter, the laser processing apparatus 1 starts laser processing for a work (Step S130). The laser processing apparatus 1 performs laser processing in the work 31 in order according to an NC program. A process order of each product by the laser processing apparatus 1 is explained. FIG. 6 is a schematic diagram for explaining the process order of each product by the laser processing apparatus.

For example, the laser processing apparatus 1 performs laser processing for each product in the order of a product M1, a product M2, a product M3, . . . , and a product Mm (m is a natural number). First, the laser processing apparatus 1 performs piercing of a processing start position (a pierce position S1) for performing laser processing for the product M1. Then, a pierce line is processed to the periphery (a start position T1) of the product M1. Thereafter, laser processing is performed on the periphery of the product M1 from the start position T1 to the start position T1 (for one circuit) to separate the product M1 from the work 31.

After completing laser processing for the product M1, the laser processing apparatus 1 moves the processing head to a processing start position (a pierce position S2) for the next product M2. Next, the laser processing apparatus 1 performs piercing of the processing start position (the pierce position S2) for performing laser processing for the product M2. Then, a pierce line is processed to the periphery (a start position T2) of the product M2. Thereafter, laser processing is performed on the periphery of the product M2 from the start position T2 to the start position T2 (for one circuit) to separate the product M2 from the work 31.

Thereafter, the laser processing apparatus 1 performs laser processing for each of the products M3 to Mm in the work 31 in the process order similar to the case of the products M1 and M2. In the present embodiment, when the laser processing apparatus 1 moves the processing head to a processing start position for the next product M(i+1) after completing laser processing for the product Mi (i is a natural number from 1 to (m−1)), the laser processing apparatus 1 controls the lift amount of the processing head in accordance with a tilt of the product Mi separated from the work 31.

Specifically, the positional-relationship calculating unit 14 of the laser processing apparatus 1 calculates the positional relationship between a product to be a processing target and work supports based on the support information in the support-information storing unit 12 and the work information in the work-information storing unit 13 (Step S140). The positional-relationship calculating unit 14 sends the calculated positional relationship to the tilt judging unit 15.

The tilt judging unit 15 judges whether a currently-processing product drops between work supports (on the support base 2) and tilts after completing laser processing based on the positional relationship calculated by the positional-relationship calculating unit 14.

The tilt judging unit 15 first calculates a position (a position with respect to the support base 2) of the gravity center of the product. Moreover, the tilt judging unit 15 extracts a position (a position with respect to the support base 2) of each support point of work supports supporting the product and extracts an area surrounded by respective support points as a support area.

Then, the tilt judging unit 15 judges whether the position of the gravity center of the product is within the support area (Step S150). If the position of the gravity center is outside the support area, the tilt judging unit 15 judges that the product after processing tilts. If the position of the gravity center is inside the support area, the tilt judging unit 15 judges that the product after processing does not tilt.

Figure 7:
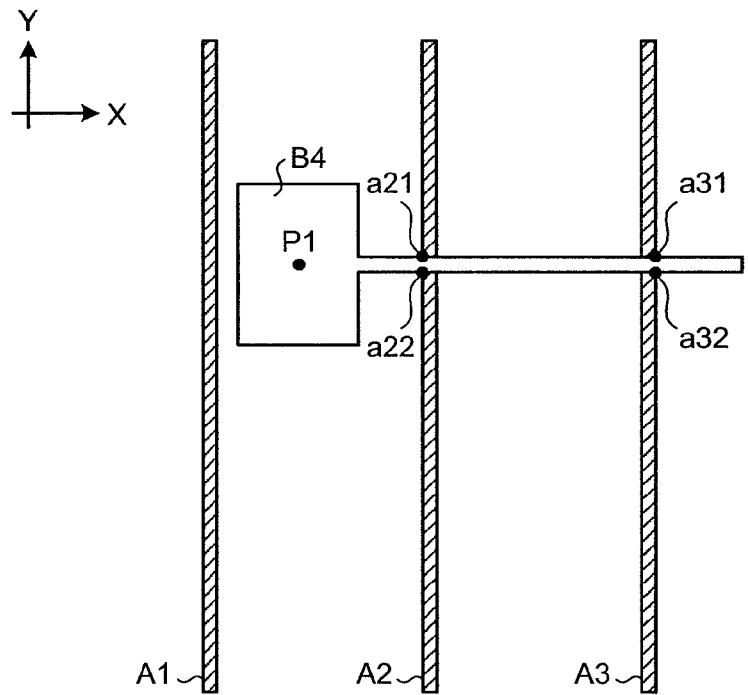
FIG. 7 is a schematic diagram (1) for explaining a case where a product after processing tilts.
Figure 8:
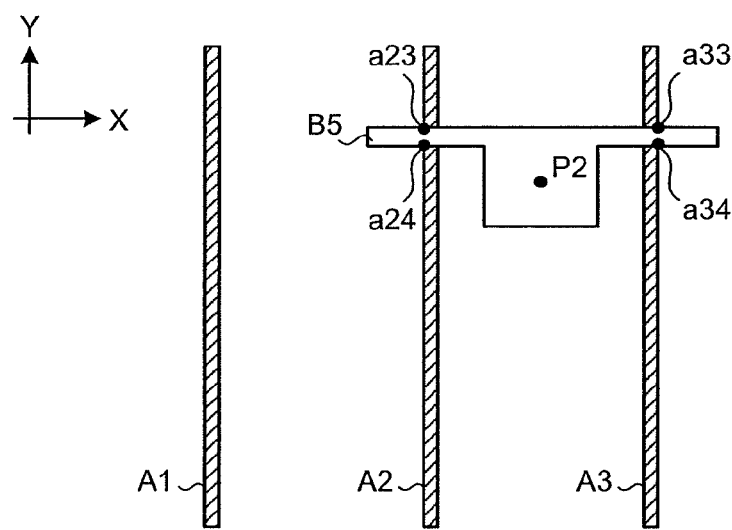
FIG. 8 is a schematic diagram (2) for explaining a case where a product after processing tilts.
Figure 9:
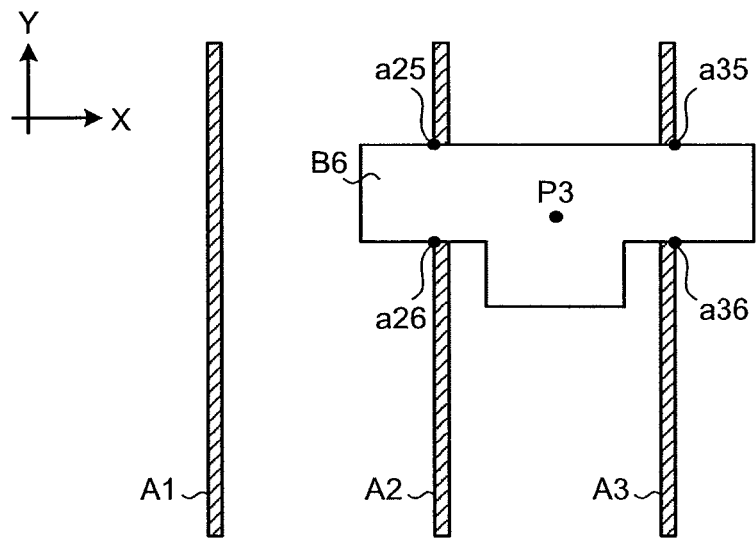
FIG. 9 is a schematic diagram for explaining a case where a product after processing does not tilt.

Here, examples of judgment of whether a product after processing tilts are explained. FIG. 7 to FIG. 9 are schematic diagrams for explaining examples of judgment of whether a product after processing tilts. FIG. 7 to FIG. 9 each show a case when the laser processing apparatus 1 is viewed from the top, in which a longitudinal direction of the work supports A1 to A3 is a Y-axis direction and a lateral direction of the work supports A1 to A3 is an X-axis direction.

In a product B4 shown in FIG. 7, a gravity center P1 is positioned between the work support A1 and the work support A2. A support point to be an edge point of the support area among support points of the work support A2 supporting the product B4 is a support point a21 and a support point a22, and a support point of the work support A3 supporting the product B4 is a support point a31 and a support point a32. The support points a21 and a22 are edge points at which the product B4 and the work support A2 are in contact with each other on the opposite side of the work support A3. The support points a31 and a32 are edge points at which the product B4 and the work support A3 are in contact with each other on the opposite side of the work support A2. Therefore, the support area is an area surrounded by four points of the support point a21, the support point a22, the support point a31, and the support point a32.

Because the gravity center P1 of the product B4 is positioned outside the support area surrounded by the support points a21, a22, a31, and a32, the product B4 is judged to tilt after being separated from the work 31. When the product B4 tilts, the product B4 tilts by the position of the gravity center P1 dropping between the work supports. The gravity center P1 of the product B4 is positioned a predetermined distance away from the support area in the X direction. Therefore, it is judged that the position of the gravity center P1 of the product B4 drops between the work supports A1 and A2 and a position (the support points a31 and a32 side) opposing the gravity center P1 via the support area in the X direction projects upward from the main surface of the work 31.

In a product B5 shown in FIG. 8, a gravity center P2 is positioned between the work support A2 and the work support A3. A support point to be an edge point of the support area among support points of the work support A2 supporting the product B5 is a support point a23 and a support point a24, and a support point of the work support A3 supporting the product B5 is a support point a33 and a support point a34. The support points a23 and a24 are edge points at which the product B5 and the work support A2 are in contact with each other on the opposite side of the work support A3. The support points a33 and a34 are edge points at which the product B5 and the work support A3 are in contact with each other on the opposite side of the work support A2. Therefore, the support area is an area surrounded by four points of the support point a23, the support point a24, the support point a33, and the support point a34.

Because the gravity center P2 of the product B5 is positioned outside the support area surrounded by the support points a23, a24, a33, and a34, the product B5 is judged to tilt after being separated from the work 31. When the product B5 tilts, the product B5 tilts by the position of the gravity center P2 dropping between the work supports. The gravity center P2 of the product B5 is positioned a predetermined distance away from the support area in the Y direction. Therefore, it is judged that the position of the gravity center P2 of the product B5 drops between the work supports A2 and A3 and a position (the support points a33 and a34 side) opposing the gravity center P2 via the support area in the Y direction projects upward from the main surface of the work 31.

In a product B6 shown in FIG. 9, a gravity center P3 is positioned between the work support A2 and the work support A3. A support point to be an edge point of the support area among support points of the work support A2 supporting the product B6 is a support point a25 and a support point a26, and a support point of the work support A3 supporting the product B6 is a support point a35 and a support point a36. The support points a25 and a26 are edge points at which the product B6 and the work support A2 are in contact with each other on the opposite side of the work support A3. The support points a35 and a36 are edge points at which the product B6 and the work support A3 are in contact with each other on the opposite side of the work support A2. Therefore, the support area is an area surrounded by four points of the support point a25, the support point a26, the support point a35, and the support point a36.

Because the gravity center P3 of the product B6 is positioned in the support area surrounded by the support points a25, a26, a35, and a36, the product B6 is judged not to tilt after being separated from the work 31. The product B6 is supported by the support points a25, a26, a35, and a36 even after being separated from the work 31.

When the tilt judging unit 15 judges that a position of the gravity center of a product is not within a support area (No at Step S150), the tilt judging unit 15 calculates the projection value (distance in the height direction that the product after processing projects with respect to a height of a work arranged before processing) based on the size (height) of work supports, the shape and the size of the product, the position of the gravity center of the product, and the like.

Figure 10:
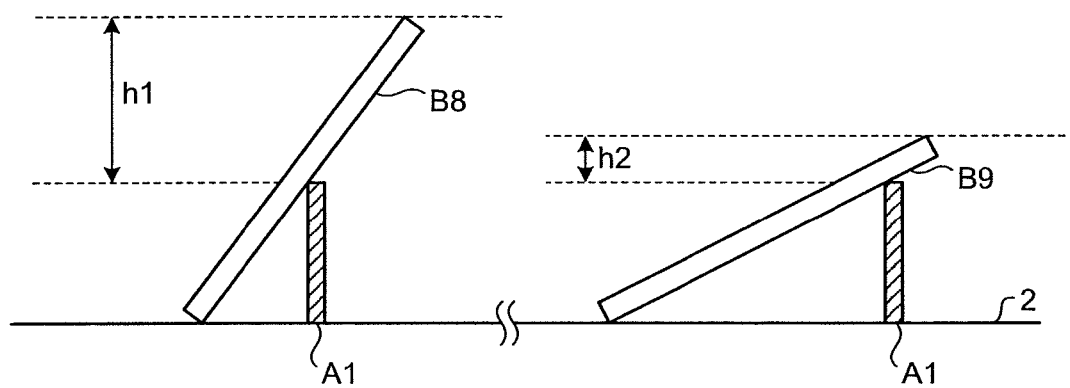
FIG. 10 is a schematic diagram for explaining a projection value of a product.

FIG. 10 is a schematic diagram for explaining the projection value of a product. The projection value of a product after processing differs depending on the height of the work support A1, the shape and the size of the product, the position of the gravity center of the product, and the like.

For example, a product B8 illustrated on the left side in FIG. 10 is in contact with the work support A1 at around the center of the product B8, so that a tilt angle (angle between the bottom surface of the support base 2 and the product B8) of the product B8 becomes large and thus a projection value h1 also becomes large.

On the other hand, a product B9 illustrated on the right side in FIG. 10 is in contact with the work support A1 near the end of the product B9, so that the tilt angle (angle between the bottom surface of the support base 2 and the product B9) of the product B9 becomes small and thus a projection value h2 also becomes small.

In the manner, the projection value becomes larger as the contact position of a product and a work support is closer to the center of the product, and becomes smaller as the contact position of the product and the work support is closer to the end of the product.

As the height of a work support is smaller, the projection value of a product projecting upward from the work support becomes smaller because a tilt amount of the product becomes smaller. Moreover, the projection value of a product projecting upward from a work support becomes larger as the size of the product is longer in the tilt direction. Furthermore, because a product tilts so that a position of the gravity center goes down, the projection value of the product projecting upward from a work support becomes larger as the size of the product on the side opposing the position of the gravity center of the product is longer. The tilt judging unit 15 sends the judgment result indicating that the product tilts and the calculated projection value to the head-lift-amount calculating unit 16.

When the head-lift-amount calculating unit 16 receives the judgment result indicating that the product tilts from the tilt judging unit 15, the head-lift-amount calculating unit 16 calculates the lift amount (height) of the processing head when moving the processing head to a processing position for the next product based on the projection value from the tilt judging unit 15 and the plate thickness of the product (the work 31) (Step S160).

Figure 11:
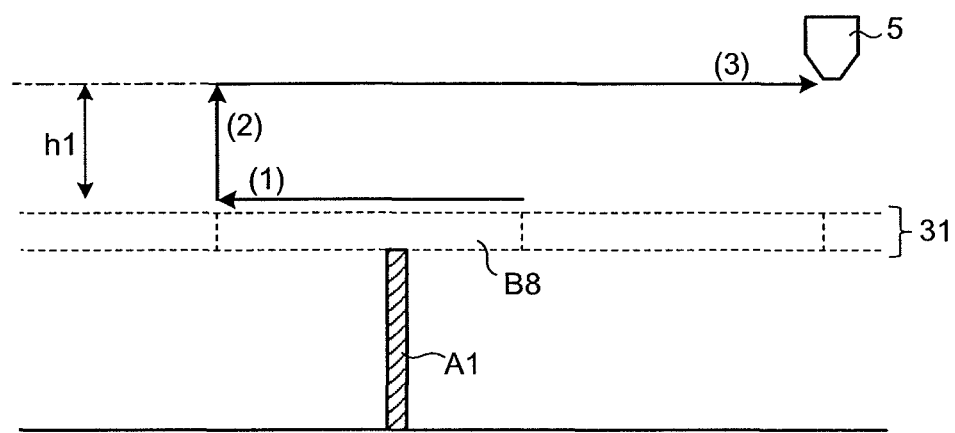
FIG. 11 is a schematic diagram for explaining a lift amount when lifting a processing head.

FIG. 11 is a schematic diagram for explaining the lift amount when lifting the processing head. FIG. 11 shows the lift amount of the processing head after processing the product B8 shown in FIG. 10. In the laser processing apparatus 1, when processing the product B8, a processing head 5 irradiates the work 31 with a laser beam from a position higher than the top surface of the work placed on the work support A1 by a predetermined distance (1).

Then, after completing processing of the product B8, the processing head 5 is lifted by a distance corresponding to the projection value h1 of the product B8 (2), and is moved to a processing start position for the next product (3).

Figure 12:
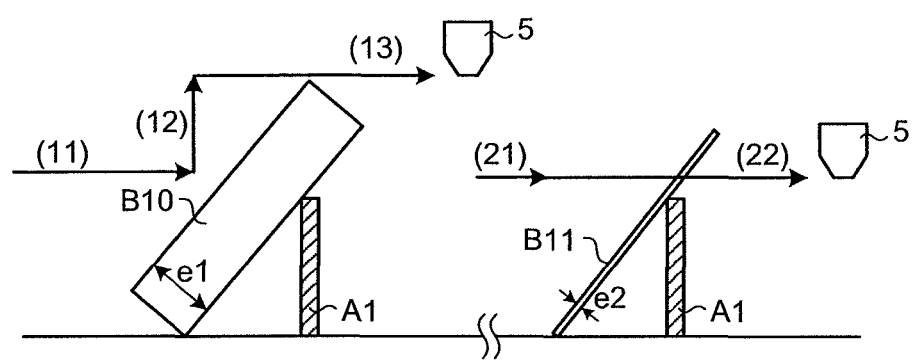
FIG. 12 is a schematic diagram for explaining a lift amount of a processing head based on a plate thickness of a product.

Next, the lift amount of the processing head 5 based on the plate thickness of a product (the work 31) is explained. FIG. 12 is a schematic diagram for explaining the lift amount of the processing head 5 based on the plate thickness of a product. In the present embodiment, the head-lift-amount calculating unit 16 changes the lift amount of the processing head when moving the processing head to a processing position for the next product in accordance with the plate thickness of the product.

For example, because a product B10 illustrated on the left side in FIG. 12 has a plate thickness e1 larger than a predetermined value, after processing the product B10 (11), the processing head 5 is lifted by a distance corresponding to the projection value (12) and is moved to a processing position for the next product (13).

On the other hand, because a product B11 illustrated on the right side in FIG. 12 has a plate thickness e2 smaller than the predetermined value, after processing the product B11 (21), the processing head 5 is moved to a processing position for the next product (22) without lifting the processing head 5.

In other words, the head-lift-amount calculating unit 16 determines whether to lift the processing head 5 when moving the processing head 5 to a processing position for the next product based on the plate thickness of a product. For example, if the plate thickness of a product is smaller than a predetermined value, because the damage of the processing head 5 even when the processing head 5 hits the product is small, the head-lift-amount calculating unit 16 causes the processing head 5 to move to a processing start position for the next product without lifting the processing head 5. On the other hand, if the plate thickness of a product is larger than the predetermined value, because the damage of the processing head 5 when the processing head 5 hits the product is large, the head-lift-amount calculating unit 16 causes the processing head 5 to move to a processing start position for the next product after lifting the processing head 5 to a predetermined height.

The head-lift-amount calculating unit 16 sets the lift amount of the processing head to 0 in the case where a product after processing does not tilt (Yes at Step S150) or the plate thickness of the product is smaller than a predetermined value. The head-lift-amount calculating unit 16 sends the calculated lift amount of the processing head to the drive control unit 17.

When moving the processing head 5 to a processing position for the next product, the drive control unit 17 lifts (moves) the processing head 5 by the lift amount of the processing head 5 sent from the head-lift-amount calculating unit 16 (Step S170). Then, the processing head 5 is moved to a processing start position for the next product in a state of being lifted.

Thereafter, the laser processing apparatus 1 performs processing for the next product (Step S180). The laser processing apparatus 1 judges whether there is a product to be processed next (Step S190). If a product to be processed next is left on the work 31 (Yes at Step S190), the laser processing apparatus 1 returns to the process at Step S140 and repeats the processes at Steps S140 to S190. That is, the laser processing apparatus 1, while performing laser processing on the next product, calculates the lift amount of the processing head 5 when moving the processing head 5 to a position for the next product after completing processing of the product. Then, the laser processing apparatus 1 controls a position of the processing head 5 in the height direction based on the calculated lift amount.

In the laser processing apparatus 1, the processes at Steps S140 to S190 are repeated until there is no product to be processed next left on the work 31. When there is no product to be processed next left on the work 31, the laser processing apparatus 1 ends the laser processing process to the work 31.

In the present embodiment, explanation is given for the case where the work 31 is subjected to laser processing by placing the work 31 on plate-like work supports; however, the work 31 can be placed on a pinholder-like work support member.

Figure 13:
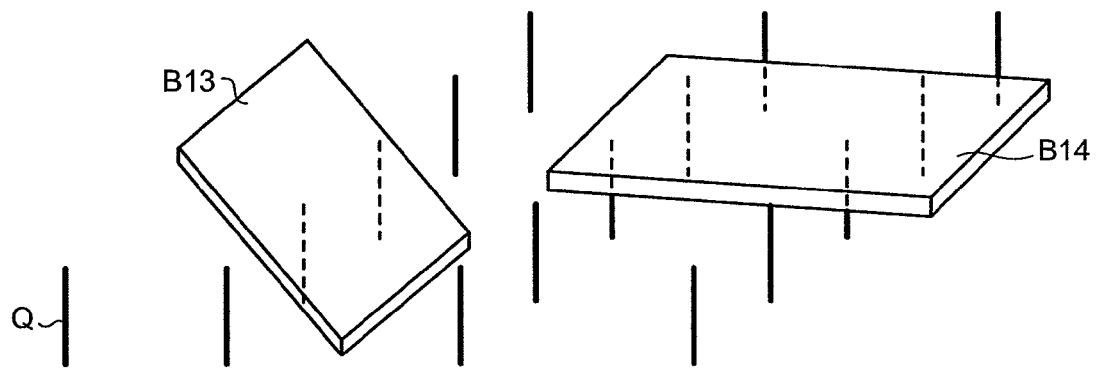
FIG. 13 is a schematic diagram for explaining a tilt of a product on a pinholder-like work support member and after processing.

FIG. 13 is a schematic diagram for explaining a tilt of a product on a pinholder-like work support member and after processing. Even when the work support member has a pinholder-like shape, a product is held at predetermined support points (needles Q) in the similar manner to the case of holding a product by work supports. A product B13 illustrated on the left side in FIG. 13 illustrates a case where a product tilts, and a product B14 illustrated on the right side in FIG. 13 illustrates a case where a product does not tilt and is held by a pinholder (support points).

Moreover, even when the work support member has a pinholder-like shape, it is judged whether a product after processing tilts based on whether the gravity center of the product is inside a support area in the similar manner to the case of holding a product by work supports.

Figure 14:
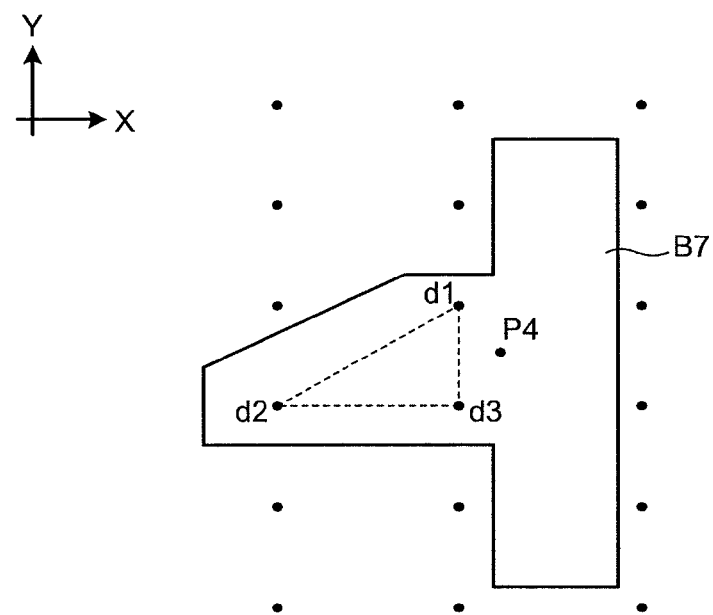
FIG. 14 is a schematic diagram for explaining a tilt judgment example of a product when a work support member has a pinholder-like shape.

Examples of a tilt judgment of a product when the work support member has a pinholder-like shape are explained. FIG. 14 is a schematic diagram for explaining a tilt judgment example of a product when the work support member has a pinholder-like shape. FIG. 14 shows a case where the laser processing apparatus 1 is viewed from the top.

In a product B7 shown in FIG. 14, a support point to be an edge point of a support area among a pinholder (support points) supporting the product B7 is a support point d1, a support point d2, and a support point d3. Therefore, the support area is an area surrounded by three points of the support points d1 to d3. Because a gravity center P4 of the product B7 is positioned outside the support area surrounded by the support points d1 to d3, the product B7 is judged to tilt after being separated from the work 31.

In the present embodiment, whether a product tilts is judged based on the position of the gravity center of the product and the position of a support area; however, it is possible to judge whether a product tilts by other methods.

Figure 15:
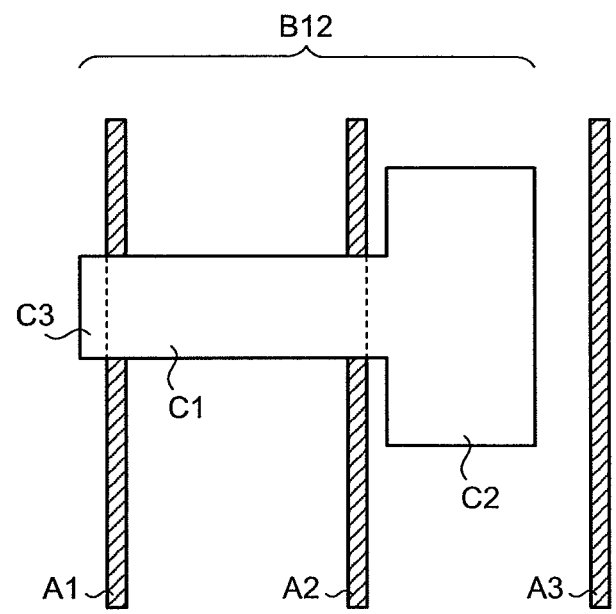
FIG. 15 is a schematic diagram for explaining another judgment example of whether a product tilts.

FIG. 15 is a schematic diagram for explaining another judgment example of whether a product tilts. For example, when a work support supporting a product is a supporting work support, the work support A1 and the work support A2 in FIG. 15 become the supporting work supports for a product B12. The tilt judging unit 15 divides the product B12 into a product portion (an intra-support-area portion) C1 positioned between the supporting work supports and product portions (out-of-support-area portions) C2 and C3 that are not positioned between the supporting work supports. The product portions C2 and C3 are product portions positioned to oppose each other via the product portion C1.

The tilt judging unit 15 can judge whether the product B12 tilts based on the area ratio between the area of the product portion C2 (the product portion C3) that is not positioned between the supporting work supports and the area of the product B12. For example, when the area of the product portion C2 (the product portion C3) is larger than 1/3 of the area of the product B12, the tilt judging unit 15 judges that the product B12 tilts.

Moreover, the tilt judging unit 15 can judge whether the product B12 tilts based on the area of the product portion C2 (the product portion C3) and the area of the product portion C1. For example, when the area of the product portion C2 (the product portion C3) is larger than the area of the product portion C1, the tilt judging unit 15 judges that the product B12 tilts.

Furthermore, the tilt judging unit 15 can judge whether the product B12 tilts based on the area (absolute value) obtained by subtracting the area of the product portion C3 from the area of the product portion C2 and the area of the product portion C1. For example, when the area obtained by subtracting the area of the product portion C3 from the area of the product portion C2 is larger than the area of the product portion C1, the tilt judging unit 15 judges that the product B12 tilts.

In the present embodiment, the height of the processing head 5 of the laser processing apparatus 1 is controlled based on the judgment of whether a product tilts; however, the height of a processing head included in an apparatus other than the laser processing apparatus 1 can be controlled based on the judgment of whether a product tilts.

Moreover, in the present embodiment, explanation is given for the case where work supports are arranged on the support base 2 at the arrangement intervals L1; however, the arrangement interval L1 is not limited to a constant interval, and work supports can be arranged at desired arrangement intervals for each interval between work supports. In this case, a value of the arrangement interval is input to the laser processing apparatus 1 in advance for each interval between work supports as the support information.

Furthermore, in the present embodiment, explanation is given for the case where the processing head 5 is moved to a processing start position for the next product after lifting the processing head 5 to the height corresponding to the projection value of a product; however, the processing head 5 can be lifted to a predetermined height that is set in advance regardless of the projection value of a product when the product after processing is judged to tilt (when a judgment result indicates that the product tilts).

Moreover, in the present embodiment, explanation is given for the case where whether to lift the processing head 5 is judged based on the plate thickness of a product; however, the tilt judging unit 15 can judge to lift the processing head 5 by a predetermined distance regardless of the plate thickness of the product when the product after processing is judged to tilt.

Figure 16:
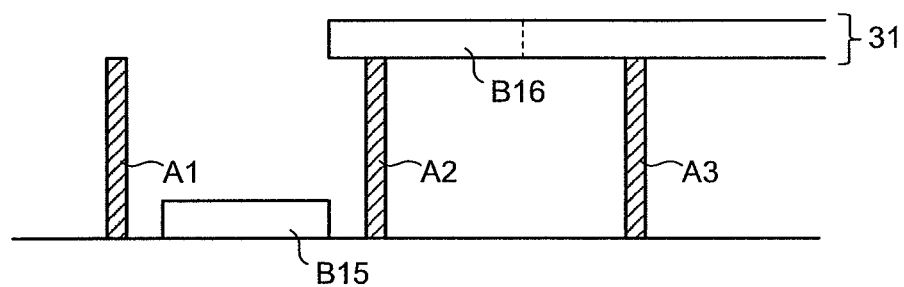
FIG. 16 is a schematic diagram for explaining a case where a product drops between work supports and is positioned lower than a height of a work.

Furthermore, in the present embodiment, when a product does not tilt, the processing head 5 is moved to a processing position for the next product without lifting the processing head 5; however, when a product B15 drops between the work supports A1 and A2 and the product B15 becomes lower than the height of the work 31 as shown in FIG. 16, the processing head 5 can also be moved to a processing position for the next product B16 without lifting the processing head 5. For example, when there is no support area present in a product after processing (when the product is not on a support point of the support base 2), the product drops between work supports after completing laser processing.

Moreover, as shown in FIG. 7, when the product B4 tilts in a direction almost parallel to the X direction, if the length (height) of the work support A2 in the Z-axis direction is longer than the length of the product B4 in the X direction, the product B4 drops between work supports after completing laser processing. Therefore, in such case, the processing head 5 is moved to a processing position for the next product without lifting the processing head 5.

Furthermore, as shown in FIG. 8, when the product B5 tilts in a direction almost parallel to the Y-axis direction, the product B5 is caught on the work supports A2 and A3 in some cases. Therefore, when the tilt judging unit 15 judges that the product B5 is caught on the work supports A2 and A3, even if the length (height) of the work supports A2 and A3 in the Z-axis direction is longer than the length of the product B5 in the Y direction, the tilt judging unit 15 judges that the product B4 tilts.

Furthermore, in the present embodiment, the processing head 5 is lifted when moving the processing head 5 to a processing position for the next product after completing processing on a product; however, the processing head 5 can be lifted when returning the processing head 5 to a processing start point (origin) of a work after completing processing for all products.

Moreover, in the present embodiment, whether a product tilts is judged based on the position of the gravity center of the product and the position of a support area; however, whether a product tilts can be judged based on the number of support points supporting the product.

For example, when a product is supported by one support point, the tilt judging unit 15 judges that the product tilts. When a product is supported by three or more support points, the tilt judging unit 15 judges that the product does not tilt. When a product is supported by two support points, the tilt judging unit 15 judges whether the product tilts based on the area of the product portion C1 positioned between supporting work supports and the areas of the product portions C2 and C3 that are not positioned between supporting work supports.

Furthermore, the tilt judging unit 15 can judge whether a product tilts based on the arrangement interval of work supports. When the arrangement interval of work supports is larger than a predetermined value, the tilt judging unit 15 judges that a product tilts because the product is easy to drop between the work supports. When the arrangement interval of work supports is smaller than the predetermined value, the tilt judging unit 15 judges that a product does not tilt because the product is hard to drop between the work supports.

Moreover, the tilt judging unit 15 can judge whether a product tilts based on the size of the product (length in an inter-work-support direction) (dimension in the X direction). When the dimension of the product in the X direction is smaller than a predetermined value, the tilt judging unit 15 judges that the product tilts because the product is easy to drop between work supports. When the dimension of the product in the X direction is larger than the predetermined value, the tilt judging unit 15 judges that the product does not tilt because the product is hard to drop between work supports.

Furthermore, the tilt judging unit 15 can judge whether a product tilts based on the size of a work support in the height direction (dimension in the Z-axis direction). When the dimension of the work support in the Z-axis direction is larger than a predetermined value, the tilt judging unit 15 judges that the product does not tilt because the product does not project above the height of a workpiece even if the product drops between work supports. When the dimension of the work support in the Z-axis direction is smaller than the predetermined value, the tilt judging unit 15 judges that the product tilts because the product projects above the height of a workpiece when the product drops between work supports.

Moreover, in the present embodiment, a user of the laser processing apparatus 1 inserts work supports at desired intervals in the support base 2 and inputs the arrangement interval of the work supports from the input unit 11; however, the arrangement interval of the work supports can be preset. In this case, a user inserts work supports into a support base so that the work supports are arranged at the preset arrangement intervals. Then, the positional-relationship calculating unit 14 calculates the positional relationship between a product and the work supports by using the preset arrangement interval (value) of the work supports.

Even when a product tilts, the processing head 5 does not hit the product in some cases depending on the moving direction of the processing head 5 after processing the product. In such case, the processing head 5 can be controlled not to be lifted. Whether the product hits the processing head 5 is judged based on the tilt direction of the product calculated by using the position of the gravity center of the product and the position of a support area.

According to the first embodiment, because a lift position of the processing head 5 when moving the processing head 5 to a processing position for the next product after processing one product is calculated for each product based on the positional relationship between the product and work supports, unnecessary lifting of the processing head 5 can be reduced. Therefore, the work 31 can be subjected to laser processing efficiently and promptly while preventing the processing head 5 from hitting a product after processing.

Moreover, because the lift amount of the processing head 5 is controlled based on a distance (projection value) that a product projects upward on the side of the processing head 5 from a work before laser processing, the processing head 5 can be lifted by an appropriate height corresponding to the projection value of each product. Therefore, the processing head 5 can be prevented from hitting a product for each product and thus the work 31 can be subjected to laser processing promptly.

Furthermore, because the lift amount of the processing head 5 is controlled based on the position of the gravity center of a product and the position of a support area surrounded by respective points of work supports supporting the product, it is possible to accurately judge whether the product after processing tilts and projects to a position higher than the work 31 for each product. Thus, it is possible to surely prevent the processing head 5 from hitting a product for each product.

Moreover, when a product drops between work supports and the product becomes lower than the height of the work support, the processing head 5 is moved to a processing position for the next product without lifting the processing head 5. Thus, unnecessary lifting of the processing head 5 can be prevented.

Furthermore, because whether a product tilts is judged based on the area ratio between the area of a product portion that is not positioned between the supporting work supports and the area of a product portion positioned between the supporting work supports, it is possible to easily judge for each product whether the product after processing tilts and projects to a position higher than the work 31. Thus, it is possible to prevent the processing head 5 from hitting a product for each product.

Moreover, the lift amount of the processing head 5 when moving the processing head 5 to a processing position for the next product is calculated based on the plate thickness of a product. Therefore, when the plate thickness of the product is large, it is possible to surely prevent the processing head 5 from hitting the product by lifting the processing head 5. When the plate thickness of the product is small such that the damage caused by the processing head 5 hitting the product can be ignored, the processing head 5 is moved to a processing position for the next product without lifting the processing head 5. Thus, the work 31 can be subjected to laser processing promptly.

Furthermore, the lift amount of the processing head 5 is calculated in real time until completing processing for each product, and after completing processing for the product, the processing head 5 is lifted by the calculated lift amount and is moved to a processing start position for the next product. Thus, the work 31 can be efficiently processed.

Second Embodiment

Next, a second embodiment of the present invention is explained with reference to FIG. 17 and FIG. 18. In the second embodiment, when the work 31 is placed on work supports without positioning the work 31, the positional relationship of the work 31 with respect to the work supports is detected to judge a tilt of a product.

Figure 17:
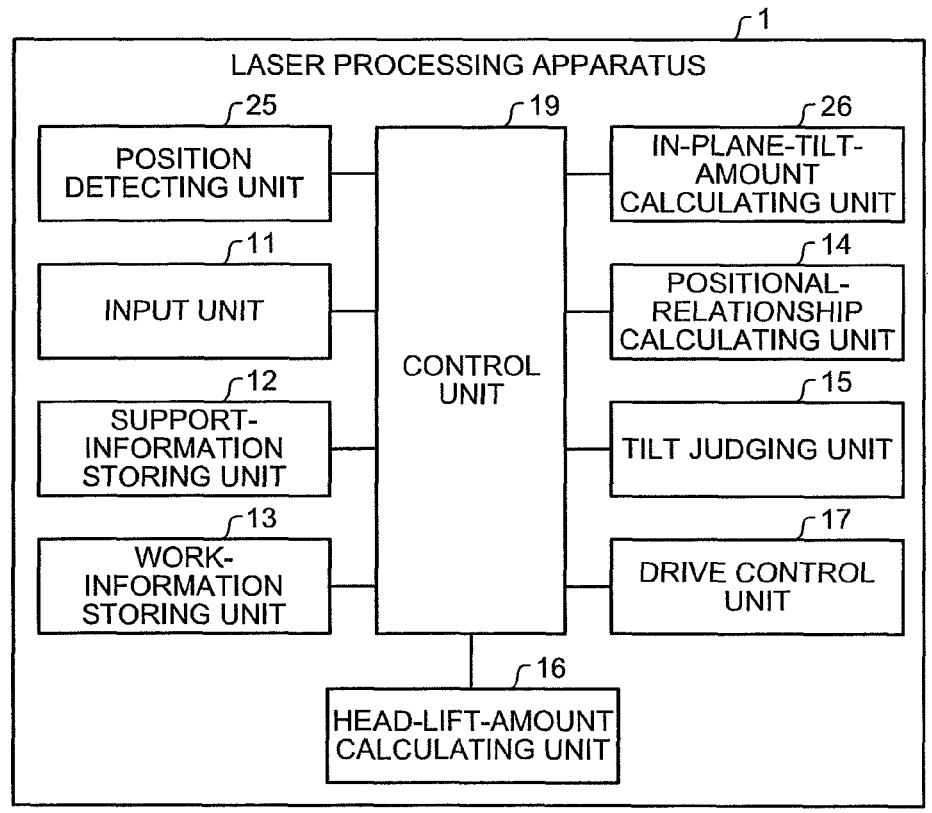
FIG. 17 is a block diagram illustrating a configuration of a laser processing apparatus according to a second embodiment.
Figure 18:
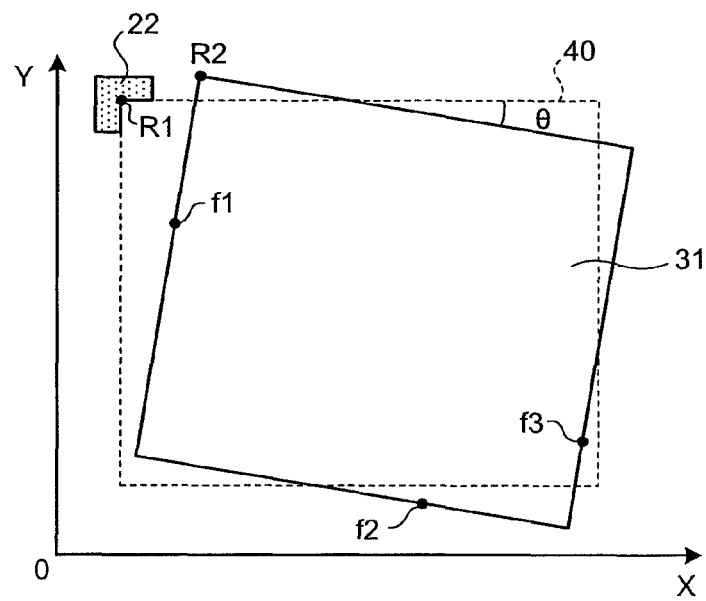
FIG. 18 is a schematic diagram for explaining a deviation amount of a work with respect to a reference position of work supports.

FIG. 17 is a block diagram illustrating a configuration of a laser processing apparatus according to the second embodiment of the present invention. Among each component shown in FIG. 17, components that achieve the same function as those of the laser processing apparatus 1 in the first embodiment shown in FIG. 1 are given the same reference numerals and explanation thereof is omitted.

The laser processing apparatus 1 includes a position detecting unit 25 and an in-plane-tilt-amount calculating unit 26 in addition to the input unit 11, the support-information storing unit 12, the work-information storing unit 13, the positional-relationship calculating unit 14, the tilt judging unit 15, the head-lift-amount calculating unit 16, the drive control unit 17, and the control unit 19.

The position detecting unit 25 detects a position of the work 31 placed on work supports. For example, the position detecting unit 25 detects the position of the work 31 by a material-end-face detecting method by a non-contact sensing method or the like utilizing a change in capacitance following an electrostatic method. The position detecting unit 25 detects positions of three points (three points not one the same line) as edge portions (outer edges) of the work 31 placed on work supports, and sends the detection result to the work-information storing unit 13 as the work information (position information).

The in-plane-tilt-amount calculating unit 26 calculates a deviation amount of the work 31 with respect to a reference position (the positioning portion 22 shown in FIG. 5 in the first embodiment) of work supports and a tilt angle (deviation angle) in an XY plane from the reference position based on the work information (the position information about the three points, and the like) in the work-information storing unit 13.

The in-plane-tilt-amount calculating unit 26 inputs the calculated deviation amount and tilt angle of the work 31 to the positional-relationship calculating unit 14 as displacement information. The positional-relationship calculating unit 14 in the present embodiment calculates the positional relationship between a product and the work supports based on the displacement information from the in-plane-tilt-amount calculating unit 26, the support information in the support-information storing unit 12, and the work information in the work-information storing unit 13.

Here, the deviation amount of the work 31 with respect to the reference position of the work supports is explained. FIG. 18 is a schematic diagram for explaining the deviation amount of a work with respect to the reference position of work supports. If the work 31 is placed on the work supports so that the work 31 comes into contact with the positioning portion 22, the work 31 is supported by the work supports at a reference position 40 indicated by a dotted line in FIG. 18.

In the present embodiment, because the work 31 is placed on the work supports by a user at a desired position without bringing the work 31 into contact with the positioning portion 22, the work 31 is not always positioned at the reference position 40. Therefore, a position of an origin R2 of the work 31 is not always the same as a position of an origin R1 of the reference position 40. The position detecting unit 25 of the laser processing apparatus 1 detects positions of points f1 to f3 as edge portions of the work 31 placed on work supports before starting laser processing to a work (before the process at Step S130 in FIG. 4).

Then, the in-plane-tilt-amount calculating unit 26 calculates the deviation amount of the work 31 (the origin R2) with respect to the reference position 40 (the origin R1) and a deviation angle θ of the work 31 from the reference position 40 based on information about the positions of the points f1 to f3 in the work information, information about the shape and the size of a work, information about the reference position 40 (the origin R1) with respect to the support base 2, and the like.

Then, the positional-relationship calculating unit 14 calculates the positional relationship between a product and work supports based on the displacement information from the in-plane-tilt-amount calculating unit 26, the support information in the support-information storing unit 12, and the work information in the work-information storing unit 13. Thereafter, the laser processing apparatus 1 performs laser processing on the work 31 by a process procedure similar to the process procedure explained with reference to FIG. 4 in the first embodiment.

According to the second embodiment, the position of the work 31 placed on work supports is detected and the positional relationship between a product and the work supports is calculated by using information about the detected position. Therefore, even when a user places the work 31 at a desired position on the work supports without bringing the work 31 into contact with the positioning portion 22, it is possible to prevent the processing head 5 from hitting the product after processing. Thus, the work 31 can be subjected to laser processing efficiently and promptly.

INDUSTRIAL APPLICABILITY

As described above, the laser processing apparatus, the process control apparatus, and the processing apparatus according to the present invention are suitable for preventing a processing head from hitting a workpiece.

The invention claimed is:

1. A laser processing apparatus in which a workpiece before laser processing is placed on a work support base that supports the workpiece at a plurality of support points and performs, while moving a processing head that irradiates the workpiece with a laser beam in a horizontal direction with respect to the workpiece, laser processing on the workpiece on the work support base by the processing head, the laser processing apparatus comprising:
   a tilt judging unit that judges, based on a positional relationship between a product chip that is to be separated from the workpiece when the workpiece is subjected to laser processing and support points of the work support base that supports the product chip, whether the product chip after laser processing tilts in a height direction and projects upward from a top surface of the workpiece before laser processing; and
   a processing head control unit that controls a height of the processing head with respect to the workpiece when moving the processing head to a processing position for a next product chip after completing laser processing on the product chip based on a judgment result of the tilt judging unit.

2. The laser processing apparatus according to claim 1, further comprising a head position calculating unit that calculates a height of the processing head with respect to the workpiece that is controlled by the processing head control unit as a head lift amount corresponding to the product chip for each product chip, wherein
   the tilt judging unit calculates a height that the product chip projects upward from the workpiece before laser processing as a projection dimension for each product chip,
   the head position calculating unit calculates the head lift amount corresponding to the projection dimension calculated by the tilt judging unit, and
   the processing head control unit controls a height of the processing head based on the head lift amount calculated by the head position calculating unit.

3. The laser processing apparatus according to claim 1, wherein the tilt judging unit, when a gravity center of the product chip is outside of a support area surrounded by support points of the work support base that supports the product chip, judges that the product chip after laser processing projects upward from the workpiece before laser processing.

4. The laser processing apparatus according to claim 1, wherein the tilt judging unit, when the product chip after laser processing is not on a support point of the work support base, judges that the product chip after laser processing does not project upward from the workpiece before laser processing.

5. The laser processing apparatus according to claim 1, wherein when the product chip after laser processing is divided into an intra-support-area portion positioned in a support area surrounded by support points of the work support base that supports the product chip and an out-of-support-area portion positioned outside the support area, the tilt judging unit judges whether the product chip after laser processing projects upward from the workpiece before laser processing based on an area ratio between an area of the intra-support-area portion and an area of the out-of-support-area portion.

6. The laser processing apparatus according to claim 2, wherein the head position calculating unit calculates the head lift amount corresponding to a plate thickness of the product chip.

7. The laser processing apparatus according to claim 1, further comprising:
   a position detecting unit that measures an arrangement position of the workpiece with respect to the work support based as position information; and
   a positional relationship calculating unit that calculates a positional relationship between the product chip after laser processing and the support points of the work support base that supports the product chip by using the position information measured by the position detecting unit, wherein
   the tilt judging unit judges whether the product chip after laser processing projects upward on a side of the processing head from the workpiece before laser processing based on the positional relationship between the product chip and the support points that is calculated by the positional relationship calculating unit.

8. A process control apparatus that, when performing laser processing on a workpiece on a work support base that supports the workpiece at a plurality of support points by a processing head that irradiates the workpiece with a laser beam, controls movement of the processing head, the process control apparatus comprising:
   a tilt judging unit that judges, based on a positional relationship between a product chip that is to be separated from the workpiece when the workpiece is subjected to laser processing and support points of the work support base that supports the product chip, whether the product chip after laser processing tilts in a height direction and projects upward from a top surface of the workpiece before laser processing; and
   a processing head control unit that controls a height of the processing head with respect to the workpiece when moving the processing head to a processing position for a next product chip after completing laser processing on the product chip based on a judgment result of the tilt judging unit.

9. A processing apparatus in which a workpiece before processing is placed on a work support base that supports the workpiece at a plurality of support points and processes, while moving a processing head in a horizontal direction with respect to the workpiece, the workpiece on the work support base by the processing head, the processing apparatus comprising:
   a tilt judging unit that judges, based on a positional relationship between a product chip that is to be separated from the workpiece when the workpiece is processed and support points of the work support base that supports the product chip, whether the product chip after processed tilts in a height direction and projects upward from a top surface of the workpiece before processing; and
   a processing head control unit that controls a height of the processing head with respect to the workpiece when moving the processing head to a processing position for a next product chip after completing processing on the product chip based on a judgment result of the tilt judging unit.

10. The laser processing apparatus according to claim 1, wherein the tilt judging unit judges whether the product chip that has separated from the workpiece is inclined in the upward direction toward the processing head based on a gravity center of the product chip with respect to the support points and wherein the support points are part of the work support base that supports the workpiece.

11. The laser processing apparatus according to claim 1, wherein the tilt-judging unit judges whether the product chip dropped below the workpiece based on position of the support points of the work support base and based on dimensions of the product chip.

12. The laser processing apparatus according to claim 1, wherein the processing head control unit determines if the processing head is to be moved in the upward direction based on a thickness of the workpiece.

13. The laser processing apparatus according to claim 12, wherein, if the workpiece is low in thickness, the processing head control unit allows the processing head to contact the product chip and does not move the processing head in the upward direction.

14. The laser processing apparatus according to claim 1, wherein the tilt judgment unit determines the height to move the processing head so as to avoid collision with the product chip and so as to avoid surplus movement in the height direction.

\* \* \* \* \*